April 26, 1932. F. A. ANTON 1,855,376

LATERAL ARM AWNING FRONT POLE CLAMP

Filed Jan. 14, 1931

Inventor
Frederick A. Anton.
By Thorpe & Thorpe
Attorneys

Patented Apr. 26, 1932

1,855,376

UNITED STATES PATENT OFFICE

FREDERICK A. ANTON, OF TOPEKA, KANSAS

LATERAL ARM AWNING FRONT POLE CLAMP

Application filed January 14, 1931. Serial No. 508,637.

This invention relates to clamping connections to secure the front pole to the outer ends of the lateral arms of lateral arm awnings, the prime object of the invention being to provide a connection of such nature that the clamp or pivotal connection of the front pole, particularly when comprising a pipe or cylindrical rod, shall reliably hold a fixed position and shall not shift longitudinally in either direction along the length of the front pole.

In the construction and installation of lateral arm awnings, it is of prime importance that the hinge points of the various parts shall always bear a fixed relation to each other, the point of greatest difficulty with metal front poles having been the practical impossibility of securely clamping onto the front pole, as there is a heavy thrust tending to shift the clamps longitudinally of the pole, in the opening and closing movements of the awning.

It has heretofore been customary to encircle the front pole with a split clamp terminating in a pair of ears to be engaged with the opposite sides of the front end of the outer member of the lateral arm of the awning, but, due to variations in thickness of the outer ends of such arms, the degree of clamping pressure on the pole varies. As an auxiliary clamping means, the split clamps are tapped and carry a set screw to be clamped upon the pole, the set screw being usually depended upon to fix the clamp against longitudinal slippage. However, the thrust is so strong during the opening and closing of an awning that it has been found impossible to maintain the clamp in fixed relation under all service conditions. When the clamp shifts its position, the awning will not properly close, or if forcibly closed, it will not properly open. Difficulties of this character have led to a great service expense.

With the general objects named in view of providing a reliable clamp for engagement with the ordinary cylindrical metallic front poles of lateral arm awnings, the invention consists in certain novel and useful features of construction and combinations of parts as hereinafter described and claimed; and in order that it may be fully understood, reference is to be had to the accompanying drawings, in which:—

Figure 1:
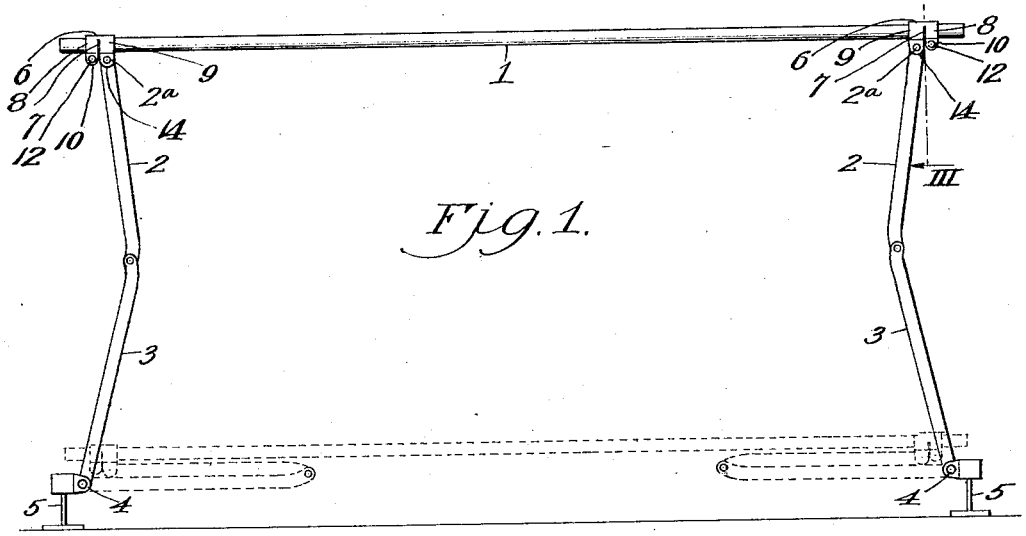
Figure 1 is a top plan view of a lateral arm awning embodying the invention in combination with the awning arms and front pole, the awning fabric being omitted to more clearly illustrate the underlying parts.
Figure 2:
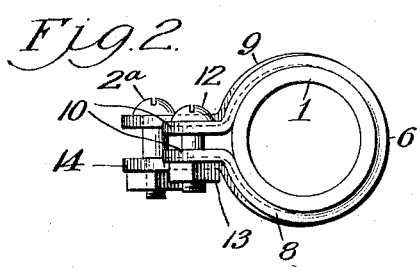
Figure 2 is an end view of the awning pole and clamp.
Figure 3:
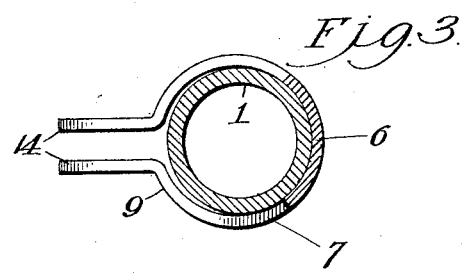
Figure 3 is a section on the line III of Figure 1.
Figure 4:
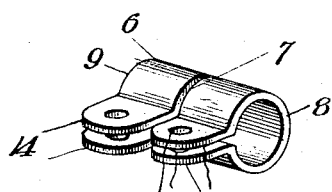
Figure 4 is a perspective view of the preferred clamping device of the invention.

In the said drawings, where like reference characters identify corresponding parts in all of the figures, 1 indicates the front pole of a lateral arm awning, 2 the front or outer members of conventional lateral folding arms, said members being pivoted on bolts 2a carried by the front pole clamps as will hereinafter appear. The rear members 3 of the lateral folding arms are pivoted at their outer ends to the rear ends of the member 2 as common, and the inner ends of said arms 3 are pivoted on bolts 4 carried by brackets 5 secured to the front of a building or the like. The arms 2 and 3 are illustrated in full line positions when the awning is open, and in dotted line position when the awning is closed, it being noted that in the latter position, the arms 2 and 3 and the pole 1 all occupy a position parallel to the building front and in close proximity to one another. It will be obvious from a consideration of the folded position of the parts that a slight shifting of either or both the pivotal points 2a will result in a failure of the awning to properly fold, or will result in the binding of the parts and a failure to unfold properly.

The couplings or pole clamps each comprise a longitudinally split sleeve 6, and the latter for approximately two-thirds of its circumference is split transversely at 7, said split intersecting the longitudinal split and dividing the tube into a pole clamping member 8 and a lateral arm connecting member 9. The sleeve 6 is provided at each side of the longitudinal split and at the same side of slot 7, with a lug 10, said lugs having alined perforations 11 for the reception of a bolt 12 for bearing at its headed end on one of the lugs and for receiving a nut 13 for engaging the other lug for take up purposes so that the sleeve can be clamped rigidly upon the pole 1.

The sleeve 6 is also provided at each side of the longitudinal slit and at the same side of the slit 7, with perforated lugs 14, the same being substantially longer by preference than lugs 10 and receiving a preferably shouldered bolt 2a engaged by a retaining nut. A shouldered bolt 2a is not essential but is desirable as it will guard against any chance of the lateral arm fitted between the lugs 14 and pivoted on the bolt, from being clamped enough to interfere with free pivotal action, it being understood, that the lugs 14 are long enough to permit the lateral arm when folded to extend parallel with and in close proximity to the pole, as indicated in dotted lines in Figure 1.

A coupling such as described, cannot slip or creep under lateral pressure applied by the arm in folding as such force is applied to one side of the active clamping surface of the coupling, and also because such force applied on bolt 2a will tend to cant or twist the member 6 to an angular position relative to the pole so that it will tend to bind above and below the longitudinal slot against the pole to resist slipping.

Figure 5:
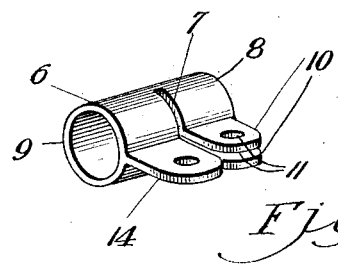
Figures 5 and 6 are perspective and plan views respectively of modified forms of the clamping device.
Figure 6:
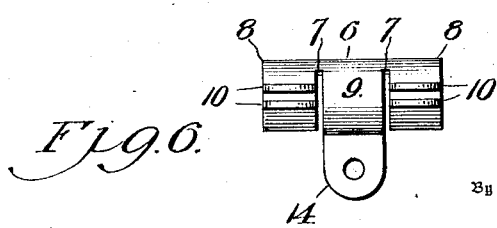

Referring to Figure 1, it will be noted that where the lugs 10 and 14 are in plane of the folding arm action, as shown, it is essential that the clamp be fitted onto the pole 1 in such position that the inner arms will fold away from the clamping lugs 10, as otherwise the awning could not be collapsed to its full extent as said lugs would constitute stops or obstructions to the movement of the pole. It will be evident, however, that this objection could be obviated by placing the lugs 10 and 14, say 90° apart (see Figure 6), and with such a modified construction, there may be two sets of ears 10 and consequently two clamping rings, one on each side of the ears 14. In Figure 5 a modified construction involving the use of but a single lug 14, is illustrated.

From the above description, it will be apparent that while I have described and claimed the preferred embodiment of the invention, it is to be understood that I reserve the right to make all changes within the spirit of the invention and without the ambit of the prior art.

I claim:—

1. The combination in an awning, of a front pole and a folding arm, a split clamping sleeve fitting on said pole, and separate means spaced apart on the sleeve for respectively clamping the sleeve to the pole and for pivotally connecting the sleeve and the folding arm.

2. A clamping sleeve laterally divided for a portion of its diameter into two sections, each section having pairs of spaced clamping lugs and being slit longitudinally between such lugs.

3. A clamping sleeve laterally divided for a portion of its diameter into two sections, each section having pairs of spaced clamping lugs and being slit longitudinally between such lugs; the lugs of one pair being disposed in angular relation to the lugs of the other pair.

4. A sleeve slit transversely and provided at one side of the slit with an outwardly-projecting lug and at the opposite side of said slit with a pair of cooperating spaced lugs; the sleeve being slit longitudinally between the spaced lugs to permit them to approach when subjected to clamping force.

5. The combination with an awning pole and a pair of foldable arms, of a pair of spaced sleeves fitted on the pole and each provided with intersecting longitudinal transverse slits and with a pair of cooperating spaced lugs at opposite sides of the longitudinal slit and at the same side of the transverse slit, means engaging the lugs of each sleeve to exert force thereon to clamp the sleeves on the pole, and means pivotally connecting the foldable arms to the sleeve at the opposite sides of the transverse slits from the said lugs.

6. The combination of a pole, a pair of swing arms, a pair of sleeves fitting on the pole and each provided with intersecting longitudinal and transverse slits, and with a pair of lugs at opposite sides of the longitudinal slit and the same side of the transverse slit, means engaging the lugs of each sleeve to exert force thereon to clamp the sleeve on the pole, a pair of spaced lugs at the opposite side of the transverse slit of each sleeve from the first-mentioned pair of lugs thereof, for receiving between them an end of the respective swing arm, and a pivot extending through the second pair of lugs of each sleeve and the interposed arm.

In testimony whereof I affix my signature.

FREDERICK A. ANTON.